United States Patent

[11] 3,579,830

[72] Inventor Joseph Morel
 14 Villers Bocage, France
[21] Appl. No. 862,728
[22] Filed Oct. 1, 1969
[45] Patented May 25, 1971
[32] Priority Oct. 1, 1968, Sept. 19, 1969
[33] France
[31] PV168337 and PV69-31944

[54] BONE IMPLANT
 7 Claims, 6 Drawing Figs.
[52] U.S. Cl. .................................................... 32/10
[51] Int. Cl. ............................................. A61c 13/00
[50] Field of Search .......................................... 32/10

[56] References Cited
UNITED STATES PATENTS
3,466,748 9/1969 Christensen.................. 32/10

OTHER REFERENCES
Implant Research Corporation, 1 sheet, Sept. 19, 1968

Primary Examiner—Robert Peshock
Attorney—Browdy and Neimark

ABSTRACT: A bone prothesis implant as disclosed is formed by a metal rod which terminates in a screw in the form of a gimlet of conical pitch with rounded edges. This screw, intended to be introduced into the bone, is characterized in that each of its threads, except that of the point, appears in elevation as a truncated cone, of which the bases are inclined relatively to the axis of the screw. The end of the screw preferably ends in a point, so as to be able easily to penetrate into the bone.

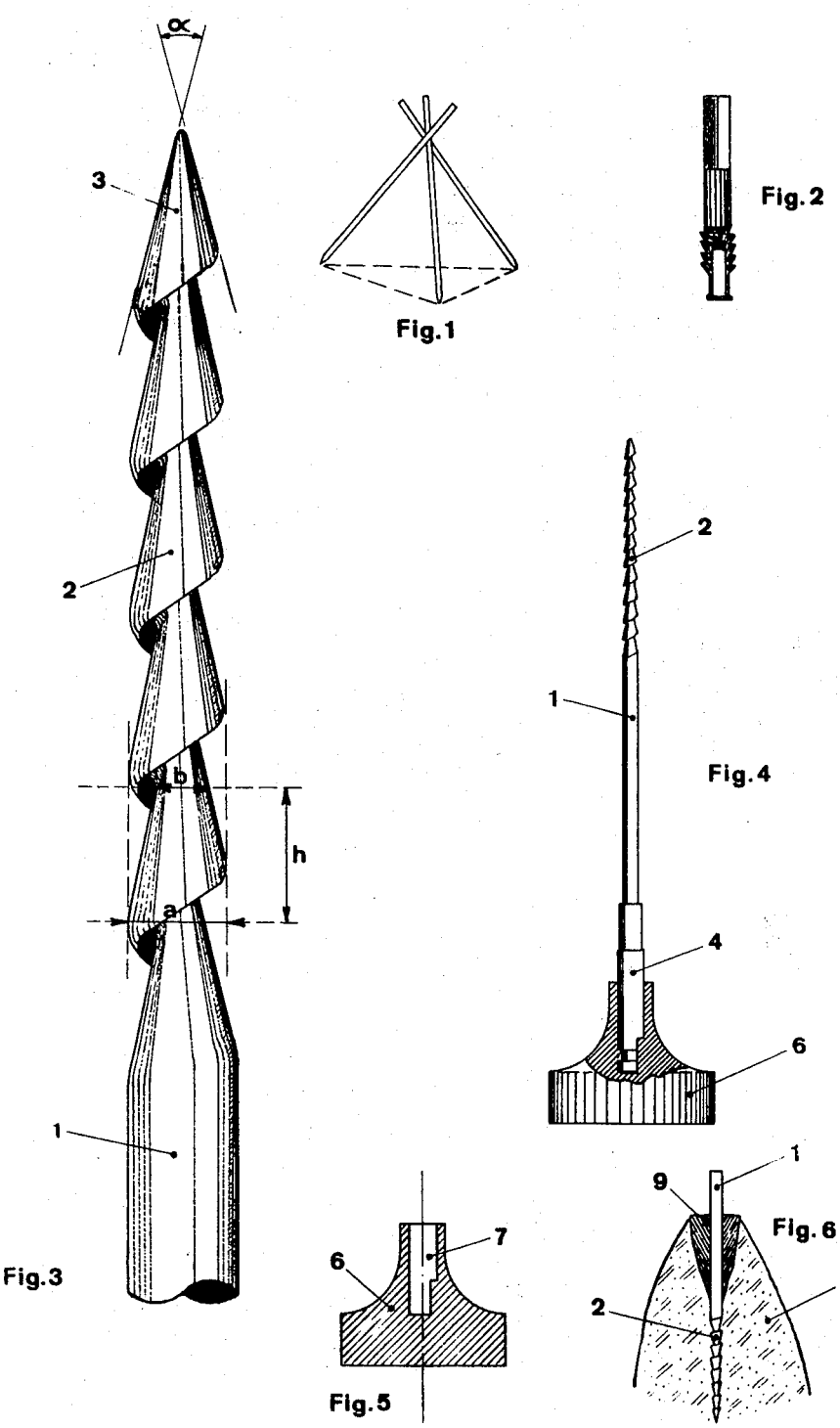

BONE IMPLANT

The present invention relates to a new bone prothesis element, more particularly an implant intended to be fixed in a bone tissue. It can be applied quite generally to bones in various parts of the body; it is of outstanding interest in odontology.

Modern bone surgery technique has used to an increasing degree various implants, of which the shape and the dimensions vary according to where they are to be used, particularly according to the bone in which they have to be fixed, for example, the femur, tibia, jaw, etc. Thus, the JUDET and SMITH-PETERSEN pins are known; for dental surgery, the different designs extend from the helical implant of FORMIGGINI to the plates of LINKOW. However, the field concerned with dental implants presents considerable difficulties, since it is normally open to infection and the final object according to the present patent is to provide a pure implant, an implant intended for root transfixions and an implant intended for obdurator transfixions.

Since 1954, experiments have been carried out particularly with synthetic resins and plates juxtaposed to the bone. Both as regards the materials and the surface bone reaction, these procedures have gradually been abandoned and experiments have been directed towards the implants which are known as endo-bone implants.

In the odontological field, where the implant serving for fixing a tooth is of very great interest, experiments have been carried out with numerous models, such as the LEHMANS arch implant, the SANDHAUS crystal implant, the PALFER-SOLLIER implant with three screws and a head plate, the CHERCHEVE spiral screw implant and the LINKOW hollow screw implant, the implant known as the needle implant formed by a tripod of three needles, driven into the bone tissue, so as to cross in a triangular group. All these implants very frequently lead to disappointments, because of the rarefaction of the bone, particularly of the mandible, the difficulty of penetration and that of semipermanent infection, which makes it necessary for the invalid to recommence the administration of antiinfectious and antiinflammatory medicines.

Although each particular development provides a solution for certain cases, none of these elements is suitable for universal use, suitable for all tissues, in all locations and under all biological conditions. The difficulties mentioned above, due to infections, to bone tissue reactions, especially with relatively large implants, and also the inconvenience of the work involved in fixing, are still very frequently found with these various types of known implants.

When it is a question of an endo-bone implant, the general tendency is to conceive a prothesis element which is fairly close to the average calibre of the natural roots. Experiments carried out by the Applicant have unexpectedly shown that such a calibre is much too large.

The conclusion reached after this long period of experiment is that it is necessary to reconcile a small calibre with a sufficiently solid rod.

The present invention provides an important technical advance by the application of a new implant which is not only very easy to position and avoids to a maximum degree, any infection or destruction of the bone tissue and the reaction of this latter, but in addition can easily be curved and thus be well-adapted to the anatomical medium being treated.

The implant according to the invention is formed by a metal rod which terminates in a screw in the form of a gimlet of conical pitch with rounded edges. This screw, intended to be introduced into the bone, is characterized in that each of its threads, except that of the point, appears in elevation as a truncated cone, of which the bases are inclined relatively to the axis of the screw. The end of the screw preferably ends in a point, so as to be able easily to penetrate into the bone.

Experience has unexpectedly shown that it is this particular form of the implant which causes the minimum of destruction of the bone tissue, while providing an extremely solid fixing. Associated with this advantage is also that of avoiding to the best possible degree the possible infections; in actual fact, by comparison with the known implants, the screw in accordance with the invention causes minimum damage to the bone tissue and extends the path of penetration of microorganisms into the interior of the bone tissue. On the other hand, the introduction of the new implant avoids the frequently painful bone heating of the conventional needles; it avoids the previous cutting of a channel, which is necessary in the case of the other types of existing implants; the screw according to the invention is introduced by rotation, i.e. screwing directly into the tissue, with great ease; in those cases where no inconvenience is caused, it can be introduced by partial percussion, followed by screwing; the operation is thus made very simple.

Although the new implant is suitable for all the bones which justify a surgical implant treatment, its advantages are of particular value in odontology. It does in fact permit successful treatment of jaws of which the bone volume is greatly reduced, in the presence or absence of the tooth root to be replaced. In this important application to jaw bones and to certain fractured bones, the invention has certain preferred features as regards the relative and absolute dimensions of the implant screw.

Thus, according to a first preferred feature, the height of each of the truncated cones which form the screw is equal to one to two times the diameter, i.e. the diameter of the large base of the truncated cone; this ratio between the height and the large base is preferably 1.3 to 1.7 or better still, 1.4 to 1.6.

Another preferred feature consists in that the ratio between the diameter of the large base and that of the small base of each of the truncated cones is of the order of 1.5 to 2.5 and preferably 1.75 to 2.25; the best ratios are between 1.9 and 2.1.

The angle of the apex of the truncated cones and of the terminal point of the new implant is generally from 20° to 45° and preferably from 30° to 40°.

As regards the value of the pitch number per centimeter of the screw, in other words, the height in absolute value of the truncated cones forming the screw, the preferred values are 5 to 15 pitches or better still 6 to 10 and particularly 6.2 to 8.3 per centimeter, this corresponding respectively to truncated cone heights of 0.7 to 2 mm, or better still 1 to 1.8 mm and preferably from 1.2 to 1.6 mm.

The odontological implants according to the invention can generally have diameters which are from 0.8 to 2 mm. However, in order to ensure the aforementioned advantages to a best possible degree, it is very important for the screw not to be too coarse or too fine; excellent results are obtained with diameters of 0.8 to 1.5 mm and especially with diameters of 1.2 to 1.3 mm.

In an improved form of the new implant, transverse cavities or striations are provided on the external surface of the threads of the screw, in order to improve fixing of the latter to the bone.

In its preferred embodiment, the implant according to the invention is held fast with a mandrel which can be fitted on the appropriate odontological instrument; the mandrel can be normal, i.e. with a diameter of 2.32 mm. After the implant has been fixed in the bone, the practician cuts the rod to the required length, thus removing the mandrel, for mounting the prothesis on the end of the rod which remains. For screwing in the implant, a particularly useful means consists in using a knurled button which can be fitted on to the end of the mandrel, this permitting the practician to sense the work being carried out and thus to be able to proceed with all the necessary precautions, such as not provided by the mechanical means normally employed.

The implants according to the invention can be made of all metals which are corrosion-resistant in the biological media in which they have to be used and having good mechanical characteristics. Generally suitable for this purpose are the special stainless steels, the use of which in surgery is known. To be particularly recommended are the Co-Cr-W alloys which are known commercially under the trade mark STELLITE, and particularly those of these alloys of which the elasticity is sufficient to permit the implant to undergo a certain curvature when necessary.

In order to illustrate the invention, some of the odontological implants of the prior art are shown associated with the screw according to the invention in the accompanying drawing.

FIG. 1 is a diagrammatic view of a conventional three-needle fixing.

FIG. 2 shows in partial section a Linkow sleeve implant.

FIG. 3 is a side elevation, greatly enlarged, of the screw according to the invention.

FIG. 4 shows, also in elevation, and to a less enlarged scale, the complete implant according to the invention, with its screw, its mandrel and the knurled button for screwing in by hand.

FIG. 5 shows a knurled button in axial section, possibly used for screwing the mandrel of FIG. 4.

FIG. 6 is a diagrammatic section of a part of the jaw, showing the root transfixion using the implant according to the invention.

It can be seen from FIG. 3 that the implant according to the invention has a completely different form from those of the known typical implants of FIGS. 1 and 2.

The implant of FIGS. 3 and 4 comprises a rod 1, of which one end carries the frustoconical thread, comprising a succession of truncated cones 2, and terminating in a conical point 3. The mandrel 4, which is fast with the rod 1, can only be seen in FIG. 4.

The end of this mandrel can have fitted thereon a rotary instrument which is known in odontology. However, it is possible, with the object of manually introducing the implant, to use a knurled button 6 which can be fitted on the outer end of the mandrel 4; this button, which forms part of the invention, is shown in detail in FIG. 5, where can be seen the cavity 7 which is cut so as to fit exactly on the end of the mandrel.

In the nonlimiting example which is shown in FIG. 3, the ratio between the height ($h$) of each truncated cone and the diameter of the rod is 1.35; the ratio between the largest diameter ($a$) and the smallest diameter ($b$) of the truncated cones, $a/b$, is equal to 2. The angle $\alpha$ at the apex of the point 3 is 35°.

It can be seen that the whole of the screw between the point 3 and the end of the rod 1 also has a slight conicity: actually, although the ratio between the largest diameter of the cone 3 and the diameter of the rod 1 is 0.8, this ratio is 0.95 for the last truncated cone at the bottom end. This very slight conicity of the assembly is a preferred characteristic of the implant according to the invention.

FIG. 1 recalls the principle of fixing the known needle-type implants: it is seen that this implant must generally comprise three needles, defining a triangular pyramid, whereas there is absolutely no necessity for the new implant shown in FIG. 3 to be mounted in this way; very often a single implant is sufficient, but if necessary, several of them can be fixed in parallel, or at an angle, spaced from one another.

FIG. 6 shows the screw 2 penetrating into the bone tissue 8 of the jaw, the rod 1 extending through the root 9 of a tooth; the implant 1—2 here plays the part of a single transfixing implant with a retentive effect; it is extremely useful in those cases where the root no longer has a sufficient solidity to support the prothesis.

The practical application of the implant according to the invention, as compared with that of the conventional needles of FIG. 1, has shown extremely important advantages. These are referred to in the following examples.

EXAMPLE 1

Conventional screw-type and twisted implants were used for fixing teeth with different patients. The conditions of these operations and the results obtained are indicated below.

| | Age | Tooth | Holding time |
|---|---|---|---|
| Patient: | | | |
| A | 25 | 6 year molar | 2 years. |
| B | 40 | 12 year molar | 3 years. |
| C | 50 | Premolar | 1 year. |
| D | 65 | Two-element bridge | 6 months. |

In each of these cases, these lengths of time could only be obtained with administration of antiinfectious medicines.

EXAMPLE 2

Teeth were fixed to patients by means of one screw or two screws according to FIGS. 3 and 4, with a diameter of 1.2 mm. In this case, the following results were observed.

| | Age | Tooth | Holding time without incident, years |
|---|---|---|---|
| Patient: | | | |
| E | 30 | Upper lateral incisor | 8 |
| F | 35 | Premolar | 4 |
| G | 50 | Upper central incisor (cancerous subject). | 3 |
| H | 20 | Upper right lateral incisor | 6 |
| I | 78 | Lower 3-tooth bridge | 3 |

In all these cases, the implant is still in position, and no medicine has had to be administered.

Cases E to I formed part of a series of 67 implantations, of which 7 (about 10 percent) were not successful, because the patients had a too rarified bone.

EXAMPLE 3

The implant according to the invention is used here for the transfixing, illustrated by FIG. 6, the root in the cases treated not being able suitably to retain an implant; the screw 2 is thus fixed in the bone of the jaw. The following Table indicates the times since the fixing of the implant; since this operation, no incident has occurred. It was sufficient to administer only aspirin for a few days after the operation.

| | Age | Transfixed tooth | Holding time without incident for: |
|---|---|---|---|
| Patient: | | | |
| J | 31 | Central | 4 years. |
| K | 35 | Lower incisor | 3 years 6 months. |
| L | 70 | Canine (for lower prothesis) | 3 years 4 months. |
| M | 66 | Upper first premolar with 2 roots. (The most difficult case). | 2 years 10 months. |

It can be seen that the holding time of the implants with a conical screw is considerably improved as compared with that of the needle-type screws in the case of a transfixion.

The foregoing description of the specific embodiment will fully reveal the nature of the invention so that it may be modified or adapted without departing from the generic concept.

I claim:

1. An implant for fixation in bone tissue, comprising a metal rod ending in a point, wherein said rod is screw threaded in its portion terminating at said point, said screw having a conical pitch and when viewed in elevation appearing as a succession of truncated cones, each having a base wherein each said cone base is inclined relatively to the axis of said screw, wherein the height of each of said truncated cones is equal to 1 to 2 times the diameter of its larger base, the ratio between the diameter of the large base and the diameter of the small base of the truncated cone is from 1.5 to 2.5, and the angle at the apex of said truncated cones and of said point is from 20° to 45°.

2. An implant according to claim 1, particularly intended for odontological prothesis, wherein the external diameter of said screw is from 0.8 to 1.5 mm, and 5 to 15 truncated cones are provided per centimeter.

3. An implant according to claim 1, wherein the external surface of the threads of the screw carries transverse cavities or striations.

4. An implant according to claim 1, wherein the overall contour of the screw shows a very slight conicity.

5. An implant according to claim 1, wherein the end of the rod opposite to the threaded portion carries a mandrel, which is adapted to fit a surgical or odontological instrument and is held fast with the rod.

6. An implant according to claim 1 formed of a cobalt-chrome alloy.

7. An implant in accordance with claim 1 wherein the height of each said truncated cone is equal to 1.3 to 1.7 times the diameter of its larger base, the ratio of the diameter of the large base to the same base is 1.75 to 2.25, the angle of inclination of each cone is 30° to 40°, the external diameter of the screw is 0.8 to 1.5 mm, and 6 to 10 cones are provided per centimeter of length of said screw.